(12) United States Patent
Horihan

(10) Patent No.: US 12,076,657 B2
(45) Date of Patent: Sep. 3, 2024

(54) ZIP LINE RAIL SYSTEM

(71) Applicant: JiMi IP, LLC, Allegan, MI (US)

(72) Inventor: Sean Horihan, Allegan, MI (US)

(73) Assignee: JiMi IP, LLC, Allegan, MI (US)

( * ) Notice: Subject to any disclaimer, the term of this patent is extended or adjusted under 35 U.S.C. 154(b) by 0 days.

(21) Appl. No.: 18/380,556

(22) Filed: Oct. 16, 2023

(65) Prior Publication Data

US 2024/0108992 A1 Apr. 4, 2024

Related U.S. Application Data

(63) Continuation of application No. 17/878,274, filed on Aug. 1, 2022, now Pat. No. 11,786,830, which is a continuation of application No. 15/931,275, filed on May 13, 2020, now Pat. No. 11,400,383, which is a continuation of application No. 15/889,011, filed on Feb. 5, 2018, now Pat. No. 10,683,018, which is a continuation of application No. 14/170,739, filed on Feb. 3, 2014, now Pat. No. 9,884,633.

(51) Int. Cl.
| | |
|---|---|
| *A63G 21/00* | (2006.01) |
| *A63G 21/20* | (2006.01) |
| *A63G 21/22* | (2006.01) |
| *B61B 3/00* | (2006.01) |
| *B61B 7/00* | (2006.01) |
| *B60T 7/18* | (2006.01) |
| *B61H 9/02* | (2006.01) |
| *F16D 63/00* | (2006.01) |

(52) U.S. Cl.
CPC ............. *A63G 21/20* (2013.01); *A63G 21/22* (2013.01); *B61B 3/00* (2013.01); *B61B 7/00* (2013.01); *B60T 7/18* (2013.01); *B61H 9/02* (2013.01); *F16D 63/008* (2013.01)

(58) Field of Classification Search
CPC .......... A63G 21/20; A63G 21/22; B61B 3/00; B61B 7/00; B60T 7/18; B61H 9/02; F16D 63/008
USPC .............................................. 104/113, 117.1
See application file for complete search history.

(56) References Cited

U.S. PATENT DOCUMENTS

| | | | |
|---|---|---|---|
| 9,702 | A | 5/1853 | Wilmot |
| 301,923 | A | 7/1884 | Reisdorff |
| 318,627 | A | 5/1885 | Keller |
| 371,483 | A | 10/1887 | Wakeman |
| 1,087,062 | A | 2/1914 | Izett |
| 1,920,744 | A | 8/1933 | Webb |

(Continued)

FOREIGN PATENT DOCUMENTS

DE 102008006611 B3 6/2009

OTHER PUBLICATIONS

Ropes Courses, Inc., 2010 Product Catalog (published Nov. 1, 2010), 20 pages.

(Continued)

*Primary Examiner* — Zachary L Kuhfuss
(74) *Attorney, Agent, or Firm* — Polson Intellectual Property Law P.C.; Margaret Polson; Christopher Sylvain

(57) ABSTRACT

The zip line rail system can be connected to a challenge course, a zip line, a zip track system, or any combination thereof. The zip line rail system of the present invention can have two rails that a member slide's two wheels rollably engage with, and the zip line rail system can be configured in any of a variety of directions.

21 Claims, 18 Drawing Sheets

(56) References Cited

U.S. PATENT DOCUMENTS

| | | | |
|---|---|---|---|
| 3,039,401 A | 6/1962 | Bishop | |
| 3,563,539 A | 2/1971 | Rogers et al. | |
| 3,577,930 A | 5/1971 | Rooklyn | |
| 3,860,089 A | 1/1975 | Huggett | |
| 3,875,866 A | 4/1975 | Mazuyer | |
| 4,256,098 A | 3/1981 | Swan et al. | |
| 4,267,900 A | 5/1981 | Yin-Lung | |
| 4,401,033 A | 8/1983 | Gerken | |
| 4,464,997 A | 8/1984 | Dehne | |
| 4,597,689 A | 7/1986 | Mitchell et al. | |
| 4,752,987 A | 6/1988 | Dreyer et al. | |
| 4,845,806 A | 7/1989 | Hamacher | |
| 4,934,277 A | 6/1990 | Smith et al. | |
| 5,156,233 A | 10/1992 | Olsen et al. | |
| 5,271,481 A | 12/1993 | Rich | |
| 5,468,199 A | 11/1995 | Keeler et al. | |
| 5,667,461 A | 9/1997 | Hall | |
| 5,890,328 A | 4/1999 | Gleave | |
| 5,924,260 A | 7/1999 | Austin et al. | |
| 5,931,100 A | 8/1999 | Sutton et al. | |
| 6,244,911 B1 | 6/2001 | Bingham | |
| 6,269,944 B1 | 8/2001 | Taylor | |
| 6,315,138 B1 | 11/2001 | Dyson | |
| 6,374,456 B1 | 4/2002 | Fort et al. | |
| 6,412,611 B1 | 7/2002 | Pribonic | |
| 6,666,773 B1 | 12/2003 | Richardson | |
| 7,175,534 B2 | 2/2007 | Liggett | |
| 7,381,137 B2 | 6/2008 | Steele et al. | |
| 7,392,747 B2 | 7/2008 | Ksyk | |
| 7,416,054 B2 | 8/2008 | Liggett | |
| 7,966,941 B1 | 6/2011 | Brannan | |
| 7,981,004 B2 | 7/2011 | Liggett et al. | |
| 7,992,680 B2 | 8/2011 | Small | |
| 8,001,904 B2 | 8/2011 | Maes et al. | |
| 8,016,686 B2 | 9/2011 | Liggett et al. | |
| 8,025,131 B1 * | 9/2011 | Boren | A63G 21/22 188/165 |
| 8,037,978 B1 | 10/2011 | Boren | |
| 8,066,578 B2 | 11/2011 | Liggett | |
| 8,286,559 B2 | 10/2012 | Robinson et al. | |
| 8,360,937 B2 | 1/2013 | Liggett | |
| 8,393,277 B2 | 3/2013 | Johnston et al. | |
| 8,683,925 B2 | 4/2014 | Liggett | |
| 8,752,668 B2 | 6/2014 | Liggett et al. | |
| 8,783,190 B2 | 7/2014 | Boren et al. | |
| 8,807,044 B2 | 8/2014 | Liggett et al. | |
| 8,807,292 B2 | 8/2014 | Liston et al. | |
| 8,893,852 B2 | 11/2014 | Liggett | |
| 8,960,098 B2 | 2/2015 | Boren et al. | |
| 9,021,962 B2 | 5/2015 | Hackett | |
| 9,033,115 B2 | 5/2015 | Lerner | |
| 9,120,023 B1 | 9/2015 | Burroughs | |
| 9,573,605 B2 | 2/2017 | Steele et al. | |
| 9,707,976 B2 | 7/2017 | Strasser | |
| 9,782,682 B2 | 10/2017 | Frankowski et al. | |
| 9,884,633 B2 * | 2/2018 | Horihan | B61B 7/00 |
| 10,016,634 B2 | 7/2018 | Weston et al. | |
| 10,093,328 B2 * | 10/2018 | Liggett | B60T 7/18 |
| 10,207,137 B2 | 2/2019 | Briggs | |
| 10,213,699 B2 | 2/2019 | Liggett | |
| 10,478,737 B2 | 11/2019 | Liggett | |
| 10,683,018 B2 * | 6/2020 | Horihan | B61B 3/00 |
| 11,376,513 B2 | 7/2022 | Liggett | |
| 11,400,383 B2 * | 8/2022 | Horihan | A63G 21/20 |
| 11,786,830 B2 * | 10/2023 | Horihan | B61B 7/00 105/113 |
| 2002/0162477 A1 | 11/2002 | Palumbo | |
| 2004/0262103 A1 | 12/2004 | Rosner | |
| 2006/0027134 A1 | 2/2006 | Steele et al. | |
| 2006/0278478 A1 | 12/2006 | Pribonic et al. | |
| 2009/0014259 A1 | 1/2009 | Cylvick | |
| 2009/0049946 A1 | 2/2009 | Buckman | |
| 2009/0078148 A1 | 3/2009 | Cylvick | |
| 2009/0255436 A1 | 10/2009 | Buckman | |
| 2009/0266267 A1 | 10/2009 | Moss | |
| 2010/0078262 A1 | 4/2010 | Townend et al. | |
| 2011/0132224 A1 | 6/2011 | Kitchen | |
| 2011/0162917 A1 | 6/2011 | Steele et al. | |
| 2012/0145498 A1 | 6/2012 | Liston et al. | |
| 2013/0118842 A1 | 5/2013 | Lerner | |
| 2013/0239841 A1 | 9/2013 | Boren et al. | |
| 2013/0239842 A1 | 9/2013 | Boren et al. | |
| 2013/0239843 A1 | 9/2013 | Boren et al. | |
| 2014/0150685 A1 | 6/2014 | Checketts | |
| 2015/0114250 A1 | 4/2015 | Watermiller et al. | |
| 2015/0141205 A1 | 5/2015 | Garland | |
| 2015/0217783 A1 * | 8/2015 | Horihan | A63G 21/20 104/113 |
| 2016/0272225 A1 * | 9/2016 | Liggett | B61B 3/00 |
| 2016/0319492 A1 | 11/2016 | Horihan | |
| 2017/0088150 A1 | 3/2017 | Christinet | |
| 2017/0259181 A1 | 9/2017 | Cylvick | |
| 2018/0154909 A1 * | 6/2018 | Horihan | A63G 21/20 |
| 2019/0143156 A1 | 5/2019 | Weston | |
| 2020/0269881 A1 * | 8/2020 | Horihan | B61B 3/00 |
| 2021/0016116 A1 | 1/2021 | Liggett | |
| 2022/0362681 A1 * | 11/2022 | Horihan | B61B 3/00 |
| 2024/0108992 A1 * | 4/2024 | Horihan | A63G 21/20 |

OTHER PUBLICATIONS

Ropes Courses, Inc., 2012 Product Catalog (published Nov. 1, 2012), 56 pages.

Ropes Courses, Inc., 2014 Product Catalog (published Nov. 1, 2014), 56 pages.

Ropes Courses, Inc., 2015 Product Catalog (publishedFebruary 1, 2015), 60 pages.

Ropes Courses, Inc., 2016 Product Catalog (published Aug. 1, 2016), 72 pages.

Ropes Courses, Inc., 2017 Product Catalog (published Aug. 1, 2017), 48 pages.

Walltopia, "Product Catalogue" (retrieved Mar. 24, 2017), 104 pages.

Walltopia, "Adventure" Project Guide (retrieved Mar. 24, 2017), 119 pages.

Walltopia, "Ropetopia" Brochure (retrieved Nov. 1, 2017), 8 pages.

Kristallturm, "High Rope Courses" Brochure (retrieved Nov. 1, 2017), 66 pages.

* cited by examiner

ZIP LINE RAIL SYSTEM

CROSS-REFERENCE TO RELATED APPLICATIONS

This application is a continuation of application Ser. No. 17/878,274 filed Aug. 1, 2022, now U.S. Pat. No. 11,786,830, which is a continuation of application Ser. No. 15/931,275 filed May 13, 2020, now U.S. Pat. No. 11,400,383, which is a continuation of application Ser. No. 15/889,011 filed Feb. 5, 2018, now U.S. Pat. No. 10,683,018, which is a continuation of application Ser. No. 14/170,039 filed Feb. 3, 2014, now U.S. Pat. No. 9,884,633, which are incorporated by reference herein for all purposes.

FIELD OF THE INVENTION

This invention relates to an apparatus that allows a user to move or be displaced in from one location to another along a zip line rail system using a rail.

This invention also relates to an apparatus and system to allow a person to safely maneuver and traverse a challenge course, zip track, zip line, and an integrated dual rail zip line. Participants are challenged to walk or scale various elements or obstacles while elevated above the ground, which can test the participant's skills such as confidence or group problem solving.

BACKGROUND OF THE INVENTION

Challenge courses are structures that allow a person or team to challenge themselves by participating in various events such as walking along swinging ropes or planks, at elevated heights. These courses are also used to train military personnel. These courses are also used at recreational parks or other such centers that have go-carts and miniature golf.

Zip lines are generally ropes or cables that are connected at both ends to fixed members of varying heights. In other words, one end is higher than the other. A participant then, by use of a pulley that rotatably engages with the rope or cable, glides from the higher end to the lower end.

The present invention uses a fixed rigid member that is engaged with two wheels to allow the user to roll along the fixed rigid member in any number of directions and trajectories.

The invention uses a non-single point of failure member or cable slide or similarly functioning member that can be used in challenge courses, zip lines, and dual rail tracks to increase the safety by having a means to keep the safety cable attached to the glide, as opposed to a single weight bearing bolt.

Multiple embodiments of the system are disclosed herein. It will be understood that other objects and purposes of the invention, and variations thereof, will be apparent upon reading the following specification and inspecting the accompanying drawings.

The challenge courses in the prior art usually have a single point of failure means extending downwardly from a moveable member within a track, whereby if this means, such as a bolt, fails, there is nothing securing the user relative to the track, or securing the user from possibly falling. Also, the member slide of the prior art do not have means for traversing on a dual rail track or system.

There exists a need for non-single point of failure member slide to increase safety for the users. There also exists the need to increase the safety while not decreasing the capacity of participants traversing back and forth from the challenge course, zip line, zip track, and a dual rail track.

The present invention is a zip line rail system that allows a user to move or displace from one location to another without effort on the user's part. This movement or displacement may be performed primarily by the force of gravity. However the present invention may also use a launch system to provide the impetus for the member slide to move. This differs from the prior art in that it may be integrally connected to a challenge course, and a zip line that uses cables or ropes, or it may be a stand-alone system.

The present invention also, rather than using cables or ropes, uses a fixed member, such as a rail, or beam or track along which the user is displaced via a glide or wheeled structure that glides or rolls on a rail, or within the beam or on a track.

There exists a need for a zip line rail system that enables a user to traverse from a challenge course or a zip track to the zip line rail system of the present invention in any particular order.

This allows the user to travel at higher speeds then a zip line using a rope or cable due to the sagging that must occur in the rope or cable zip line. The present invention also allows for safer and more expedient movement throughout the course because the user can stay engaged in the same glide structure or wheeled structure throughout the system. This system also allows the user to enter banked turns by offsetting the height of two adjacent rails.

There also exists the need to increase the safety while not decreasing the capacity of participants traversing the challenge course.

The present invention also uses a brake system to slow down the user using the member slide.

Multiple embodiments of the system are disclosed herein. It will be understood that other objects and purposes of the invention, and variations thereof, will be apparent upon reading the following specification and inspecting the accompanying drawings.

SUMMARY OF THE INVENTION

One aspect of the present invention is a zip line rail system (10), comprising: a support member (20); a rail (40) supported by the support member.

Another aspect of the present invention is a zip line rail system (10), comprising: a support member (20); said support member (20) having a plurality of plates (30) secured thereto; said support plate (30) having two arms (130) descending downwardly, each arm (130) securing a rail (40) downwardly there from; and each rail (40) being separated by a distance (120).

Another aspect of the present invention is a zip line rail system (10), comprising: two rails (40); a support member (20); a plate (30) securely connected to said support member (20); said plate (30) having two plate arms (130) that extend downwardly; each plate arm (130) supports a rail (40); each of said rail (40) separated by a distance (120); said distance (120) defines a track member opening (370); a member slide (80) having two glide means (85), one glide means (85) on each side of said member slide (80); each of said glide means (85) movably engages with each respective rail (40).

These and other features, aspects and advantages of the present invention will become better understood with reference to the following drawings, description and claims.

DETAILED DESCRIPTION OF THE INVENTION

Figure 1:
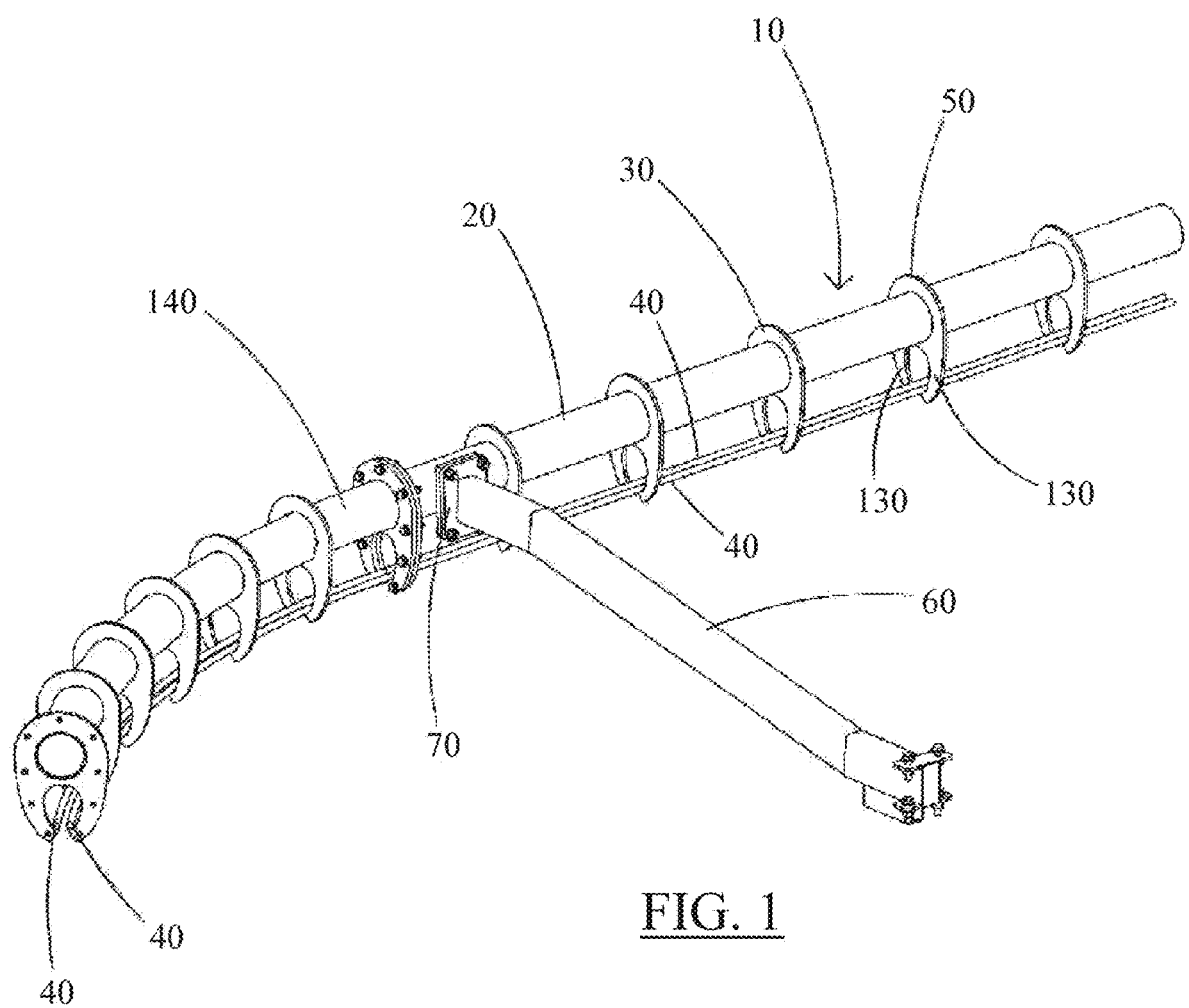
FIG. 1 is a pictorial view of one embodiment of the present invention.

Reference Numerals List 10 zip line rail system
15 modified non-single point of failure member slide
20 support member
25 alternate non-single point of failure member slide
30 plate
35 offset non-single point of failure member slide
40 rail
45 captive rail
50 upper support portion
60 arm
70 arm plate
80 member slide
85 glide means
90 wheel
100 challenge course
105 challenge course track
110 zip line
120 distance
130 plate arm
140 variety of directions
145 offset member slide frame
150 member slide frame
155 alternate member slide frame
160 puck
165 lower disk
170 upper disk
180 lower washer
190 upper washer
200 first member retention means
210 second member retention means
220 first member
230 second member
260 sheath
300 belt or strap
340 sheath-member securement device
360 inner channel
370 track member opening
390 lower retention means
420 wheel
430 axle
440 axle aperture
470 first member lower retention means
480 second member lower retention means
510 axis of rotation
600 inline brake
620 braking position
630 contact member
640 force
650 direction of travel
660 force creator
670 open position
680 braking track
685 braking track fixture
690 carriage wheel
710 carriage
720 carriage glide
730 pivot finger
800 launch system
810 sensor The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

FIG. 1 illustrates an embodiment of the present invention 10, referred to as a zip line rail system 10 or zip line dual rail system 10. In one embodiment a support member 20 supports plates 30 securely disposed intermittently thereon. The plates 30 may extend downwardly from the support member 20 to a rail 40. In one embodiment the zip line rail system 10 may have two rails 40 with a distance 120 between each of the two rails 40 so that a member slide (FIG. 3) can be supported by the wheels 90 rollably disposed on the rail 40, and can extend downwardly between each rail 40 and not contact either rail 40. Or the contact between a frame 150 or member slide frame 150 can be incidental and not affect the speed or direction of the member slide 80 as it is moved or displaced along the zip line rail system 10. In one embodiment the frame 150 may be made of aluminum.

In one embodiment the plate 30 may have an upper support portion 50 to assist in dispersing force and assist in bearing some of the load of the rails 40 and the person using the member slide 80. The plate 30 may have two plate arms 130 that extend downwardly and secure the rail 40 to each respective plate arm 130, as best seen in FIG. 2.

Figure 4:
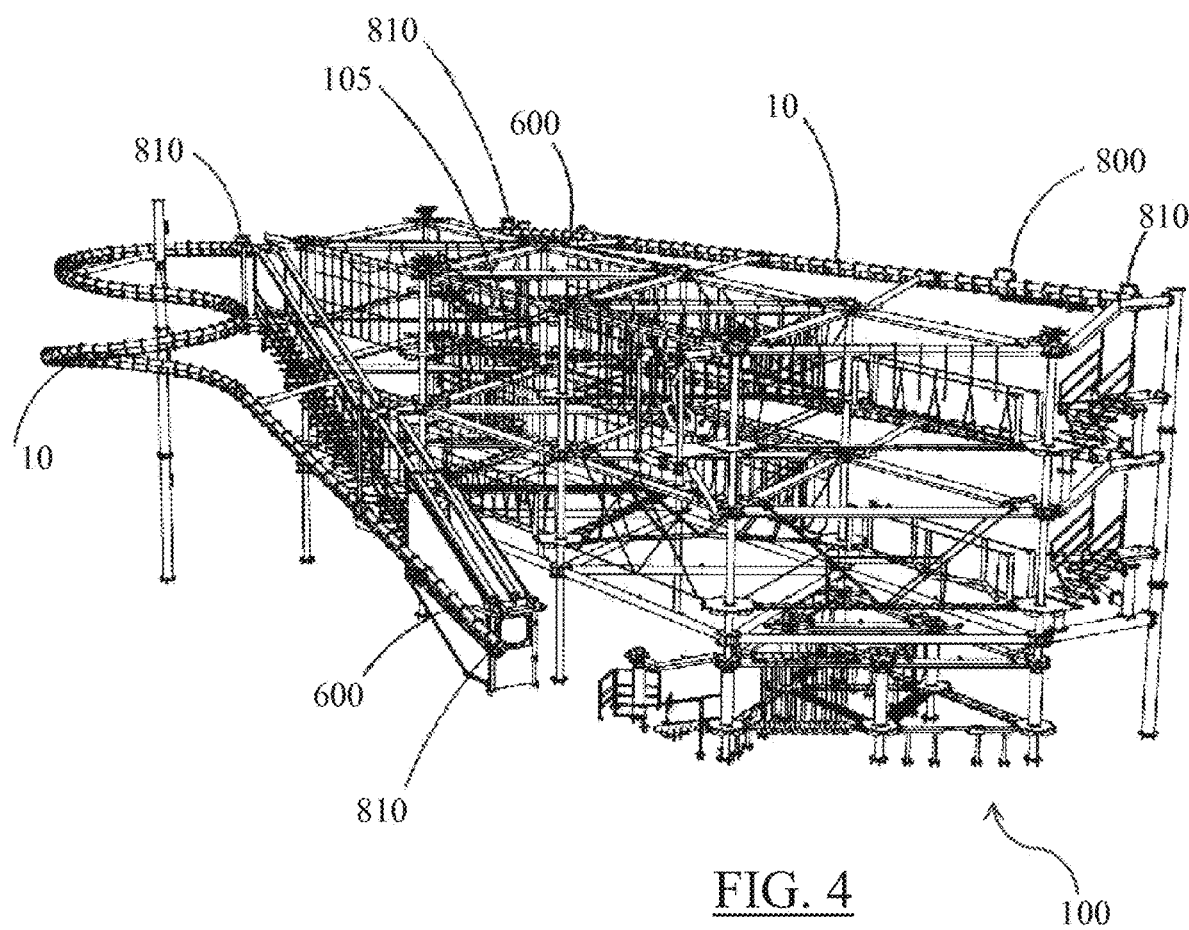
FIG. 4 is a pictorial view of an embodiment of a zip line rail system integrated with a challenge course.

An arm 60 may extend from a wall, or other fixed structure 610, such as a challenge course 100, a wall of a building, or a column extending from the ground, to the support member 20 or an arm plate 70 that is secured to the support member 20. In one embodiment the plate 70 is thicker then the plate 30 to support more force and weight at certain locations, and may assist in securing the arm 70 to either the support member 20 or the arm plate 70, or both the arm plate 70 and the support member 20. FIG. 1 also illustrates how the zip line rail system 10 may be configured in a variety of directions, heights, or coordinates 140. As seen in FIG. 4, the zip line rail system 10 may be configured in a loop.

Figure 2:
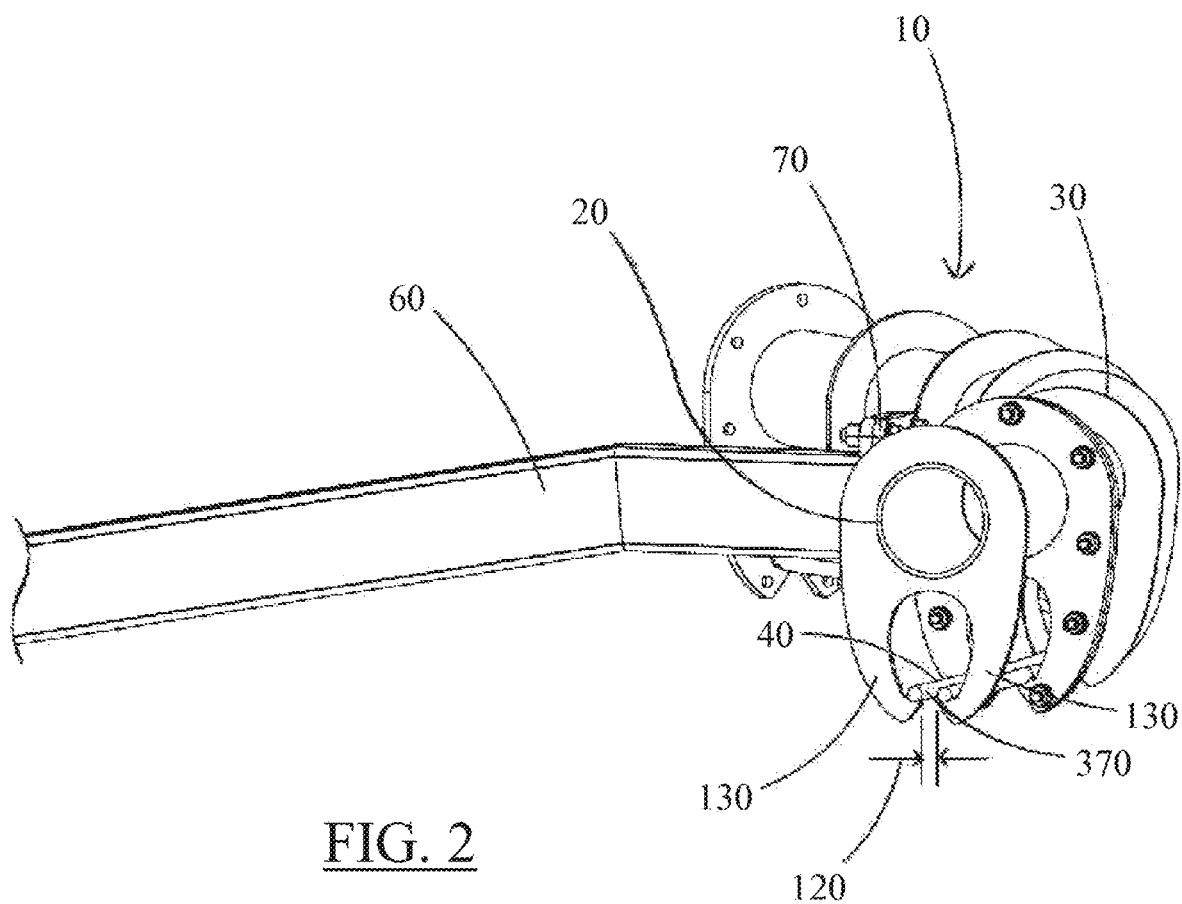
FIG. 2 is another pictorial view of an embodiment of the present invention.

FIG. 2 illustrates another embodiment of the present invention 10. The support member 20 is illustrated in a sectional view. In one embodiment the support member 20 may be circular, although it may be any shape, including but not limited to square, hexagonal, triangular, or any geometric shape. One function of the support member 20 may be to provide the majority of structural support for the zip line rail system 10.

The plate 30 may be secured to both the support member 20 and a rail 40 downwardly there from. The plate 30 may have two plate arms 130 descending downwardly from the support member 20 to a respective rail 40. In one embodiment there may be two rails 40 and they may be separated by a distance 120. An arm 30 may be securely connected to a support member 20, or to an arm plate 70, or to both the support member 20 and the arm plate 70.

Figure 3:
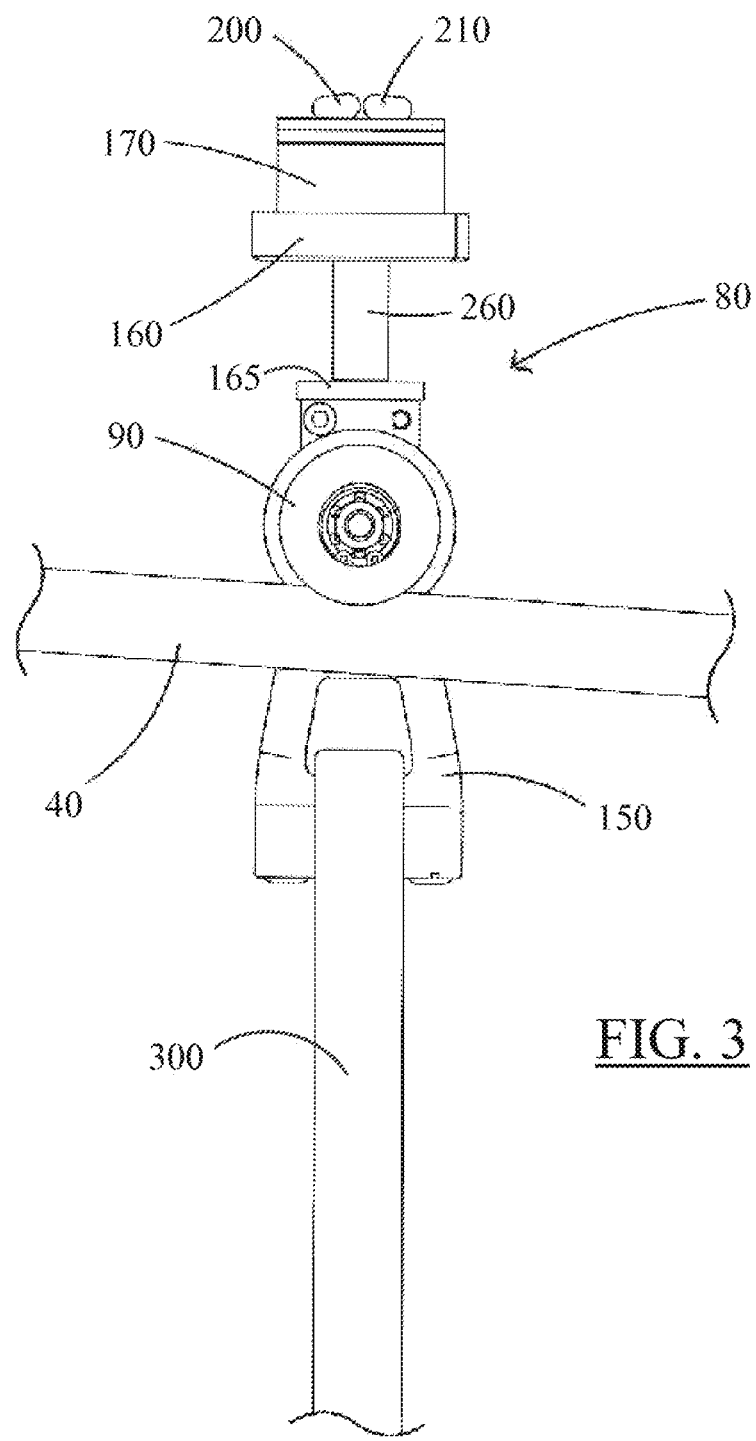
FIG. 3 is another pictorial view of an embodiment of the present invention having a member slide movably disposed on the rail; a track connected to a frame.

FIG. 3 illustrates an embodiment of a member slide 80 that may be used with the present invention 10. The member slide 80 may have a wheel 90 to roll upon a respective rail 40. The member slide 80 may have a frame 150 that may fit within the distance 120 and between each rail 40, and the wheels 90 may roll upon each respective rail 40 so that the member slide 80 can move along the zip line rail system 10. FIG. 3 illustrates components of the modified non-single point of failure member slide 15, which are shown in further detail in FIGS. 6 and 11. Said components detailed in the drawing are the belt or strap 300 which may connect the member slide 80 to a harness worn by a person utilizing the present invention 10. FIG. 3 also illustrates the member slide 80 may have a puck 160 that may slide inside the challenge course 100. A lower disk 165 and sheath 260 help protect critical load bearing components from wear caused by friction while traversing through the challenge course track 105.

In one embodiment, the sheath 260 may be Ultra-high-molecular-weight polyethylene (UHMWPE, UHMW). The first member retention means 200 and second member retention means 210 bear the load when member slide 80 may be contained by the challenge course track 105. The upper disk 170 provides support to the puck 160. The puck 160 may be replaceable, as it may wear against the inside surface of the challenge course track 105. The correlation between the member slide 80 and the challenge course track can be seen in further detail in FIGS. 12 and 15. The rail 40 may be adjacent to the challenge course 100 so the user may move from the challenge course track 105 to the zip track rail system 10 without being disengaged from a safety harness. The member slide 80 may traverse from a rail 40 to a challenge course track by means of a PUCK KEY TRANSITION SYSTEM, as disclosed in U.S. patent application Ser. No. 13/234,138, or the ZIP LINE TROLLEY TRANSPORT SYSTEM, as disclosed in U.S. patent Ser. No. 12/750,970.

FIG. 4 illustrates an embodiment of the zip line rail system 10 connected to a challenge course 100 so that a user may traverse from the challenge course 100 to the zip line rail system 10. While in the challenge course 100 the puck may be retained in the challenge course track 105 as seen in U.S. Pat. Nos. 7,174,534, 7,416,054, 7,981,004, or 8,066,578.

FIG. 4 illustrates the zip line rail system 10 may have a variety of directions and configurations. For example, it may go up, down, left, right, or any combination of any type of direction. Also, a launch system 800 may be used to accelerate the member slide 80 on a descending rail system 10 or ascending, as a roller coaster is pulled upwardly before its descent. The present invention 10 may have a series of gates and sensors 810 placed at key locations throughout the zip line rail system 10. The launch system 800 may displace or accelerate the member slide 80 at any point or any location along the zip line rail system 10.

FIG. 4 also illustrates the use of the inline brake 600. The inline brake 600 may be configured opposite to that of the launch system 800. Both the inline brake 600 and the launch system 800 use the components described herein. Further detail of said components can be seen in FIGS. 5, 8, 9 and 10.

The zip line rail system 10 may use relay logic or a programmable logic controller to actuate or energize components having control of the member slide 80 location and speed.

Figure 5:
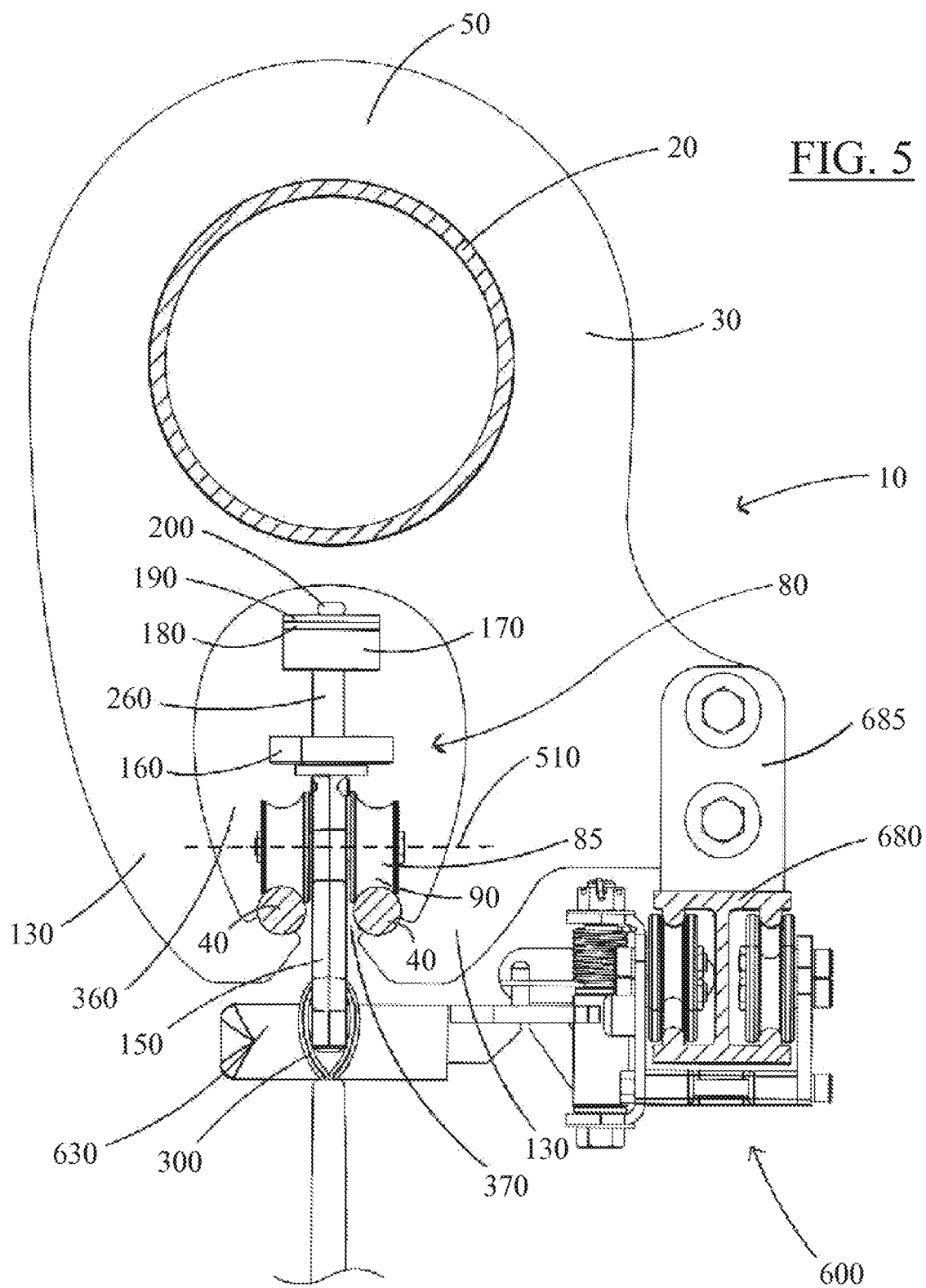
FIG. 5 is an embodiment of the present invention showing the zip line rail system, the member slide, and the inline brake.

FIG. 5 illustrates an embodiment of the member slide 80 having a frame 150 and glide means 85 by which the member slide 80 may move with respect to a rail or track 40. In one embodiment the glide means is a wheel 90. There may be two wheels 90 on opposed sides of the member slide frame 150. The wheels 90 may rotate about an axis of rotation 510. There may be two rails 40 separated by a distance 120. The space between the two rails 40 may define a track member opening 370 by which a portion of the member slide frame 150 may extend through. The member slide frame 150 may extend downwardly to a belt or strap 300. The belt or strap 300 may connect to a harness that the person may be wearing.

Figure 8:
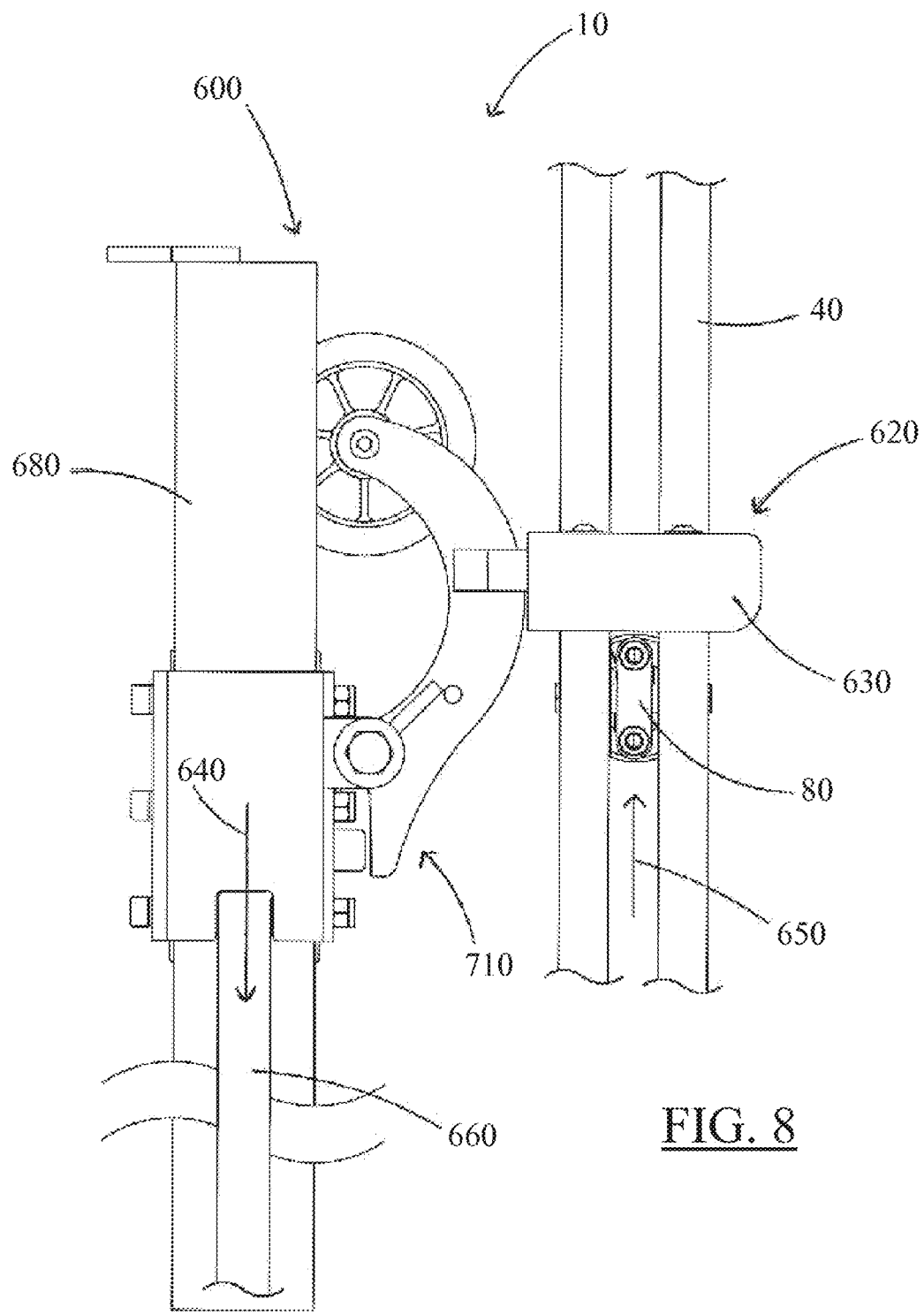
FIG. 8 illustrates an embodiment of an inline brake that can be used in the present invention when in braking position.

Each rail 40 may be supported by a plate 30, or by a series of plates as illustrated in FIGS. 1 and 8. The plate 30 may have two plate arms 130 that each rail 40 may rest upon. The plate 30 may have an upper support portion 50 that may have a support member 20 extending there through. Also, there may be an inner channel 360 that the member slide 80 may move through.

FIG. 5 also illustrates an in-line brake 600 that may be used with the present invention. The inline brake 600 may be comprised of a moveable carriage 710 shown in detail in FIG. 10. Said moveable carriage 710 may have a contact member 630. The contact member 630 interferes with the path of travel of the member slide 80. When the member slide 80 makes contact with the contact member 630 the member slide 80 may move in unison with the moveable carriage 710. Attaching a force creating mechanism to the carriage 710 would control the movements of the member slide 80. The carriage may be contained to a linear path parallel to that of the zip line rail 10 by means of a track 680. Said track 680 may be fastened to the zip line rail by a fixture 685. The fixture 685 may connect directly to the plate 30 or may be positioned with external means such as an adjacent wall or structure.

FIG. 5 also shows the upper components of the member slide 80. The puck 160 may be a wearing removable component which slides on the inner surface of the challenge course track 105. A sheath 260 protects the critical load bearing members; first member 220 and second member 230 seen in FIG. 6. First member retention means 200 and second member retention means 210 securely hold the puck 160 from passing upwardly on the slide member 160. The upper washer 190 and lower washer 180 work together with the upper disk 170 to provide support between the member retention means 200 and the puck 160. The entire upper assembly of the slide member 80 may be allowed to pass through the inner channel 360.

Figure 6:
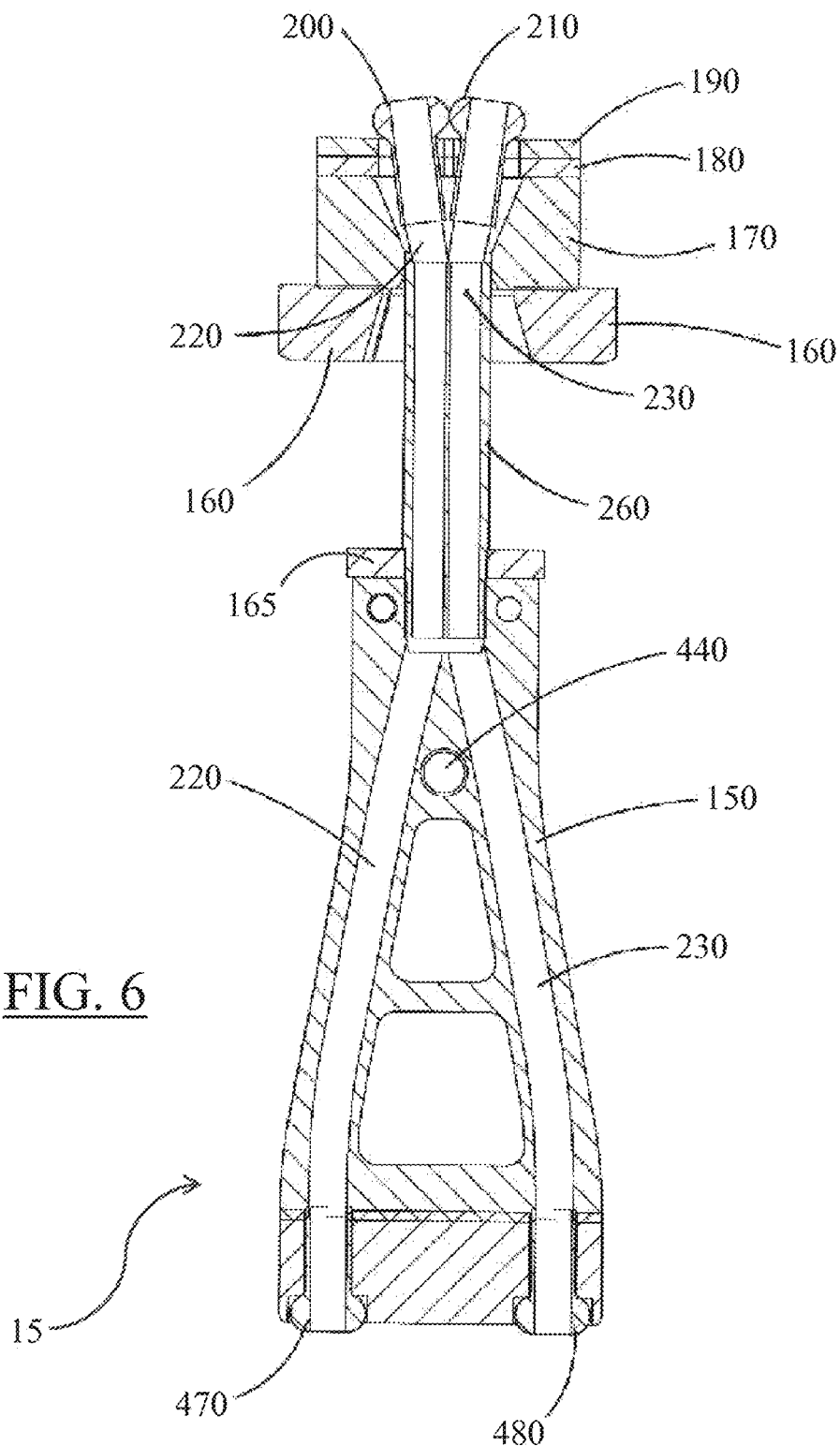
FIG. 6 illustrates a sectional view of an embodiment of a frame of the present invention.

FIG. 6 illustrates a sectional view of a modified non-single point of failure member slide 15. The member slide 15 may have a first member 220 that extends from a first member retention means 200 downwardly to a first member lower retention means 470. The member slide 15 may have a second member 230 that extends from a second member retention means 210 downwardly to a second member lower retention means 480.

The member slide 15 may have an axle aperture 440 that an axle 430 may be disposed there through. The wheels 90 may be rotatably disposed on the axle 430.

In one embodiment the first member retention means 200 is disposed upwardly from an upper washer 190 and secures a first member 220 to the first member retention means 200. The first member 220 may extend downwardly from the first member retention means 200 though an upper washer 190, downwardly from the upper washer 190 through a lower washer 180, downwardly from the lower washer 180 through an upper disk 170, and downwardly from the upper disk 170 and through a lower disk 165, and downwardly from the lower disk 165 through the member slide frame 150 to a first member lower retention means 470.

In one embodiment the second member retention means 210 is disposed upwardly from an upper washer 190 and secures a second member 230 to the second member retention means 210. The second member 230 may extend downwardly from the second member retention means 210 though an upper washer 190, downwardly from the upper washer 190 through a lower washer 180, downwardly from the lower washer 180 through an upper disk 170, and downwardly from the upper disk 170 and through a lower disk 165, and downwardly from the lower disk 165 through the member slide frame 150 to a second member lower retention means 480.

FIG. 6 also shows the removable wearing components; the puck 160 and the sheath 260.

Figure 7:
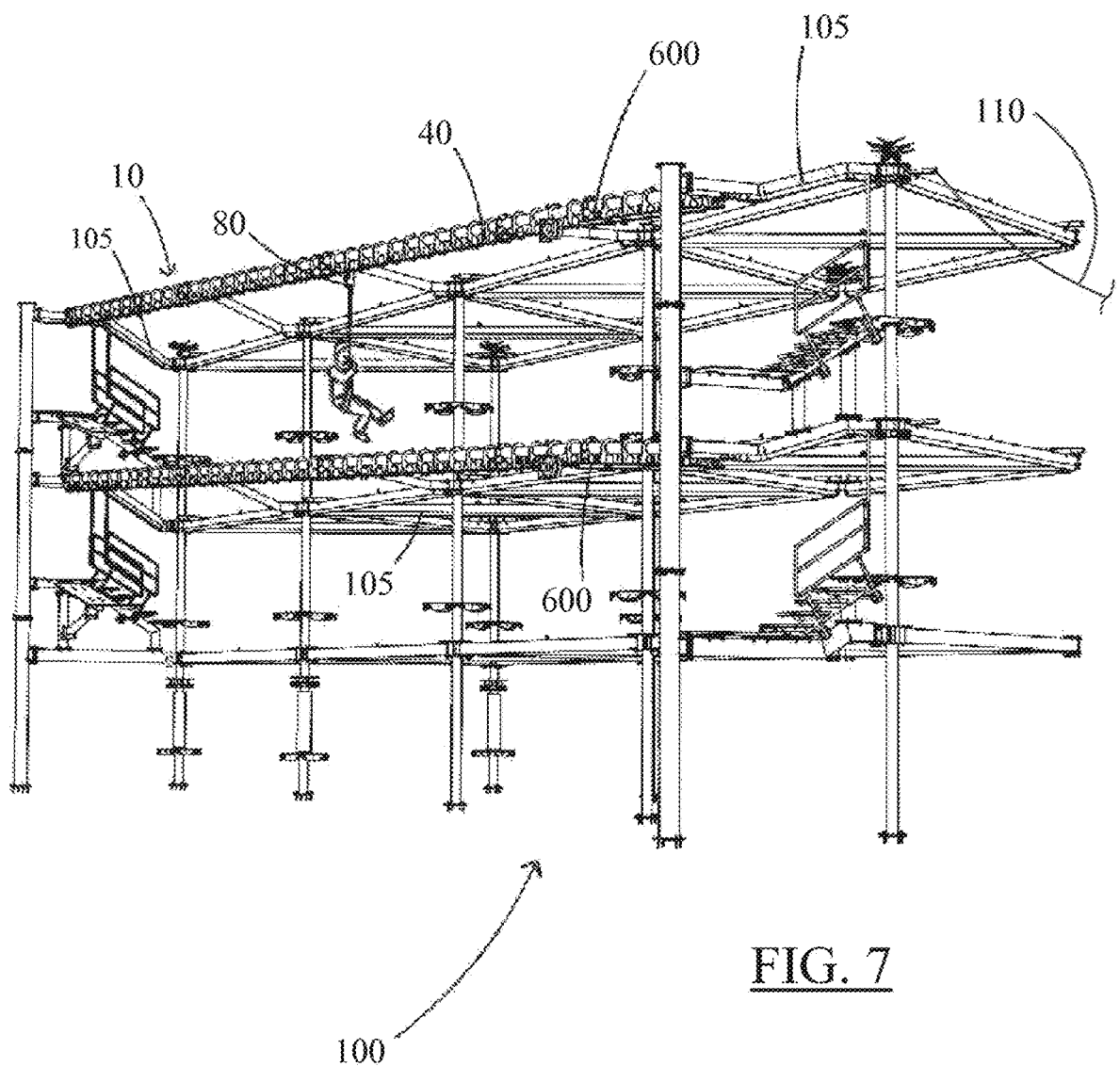
FIG. 7 illustrates an inline brake on a zip line dual rail system 10.

FIG. 7 illustrates an in-line brake system 600 that can be positioned anywhere along the zip line rail system 10, including the rail 40, zip line 110, zip track as disclosed in U.S. patent number PCT/US12/020,850, or the challenge course 100 and challenge course track 105. Any type of device that slows down the speed of the member slide 80 may be used as a braking device. However the braking device of the present invention allows the user to slow down or stop, and then continue traversing at a slow speed, such as walking with the member slide 80 being displaced along the rail 40, or the challenge course track 105. In FIG. 7 the in-line brake 600 is shown at the bottom of an inclined rail 40.

FIG. 8 illustrates an embodiment of an inline brake 600 that may be used with the present invention 10. The inline brake 600 may have a contact member 630 disposed so as to contact any portion of the member slide 80. After member slide 80 contacts the contact member 630 the contact member 630 may cause a deceleration of the member slide 80 due to, for example a force 640 directed the opposite way of the direction of travel 650 of the member slide 80. In one embodiment the force 640 may be a force creator 660, and the force creator may be a spring, a retraction device such as those found at http://retract-a-strap.com/ on 19 Dec. 2013, or an eddy current brake used in roller coasters.

FIG. 8 illustrates the inline brake being in a braking position 620. In the braking position 620 the carriage 710 has not reached the end of the braking track 680. Therefore, in the braking position 620 the contact member 630 may be positioned perpendicular to the rails 40 and in the path of travel of the member slide 80.

Figure 9:
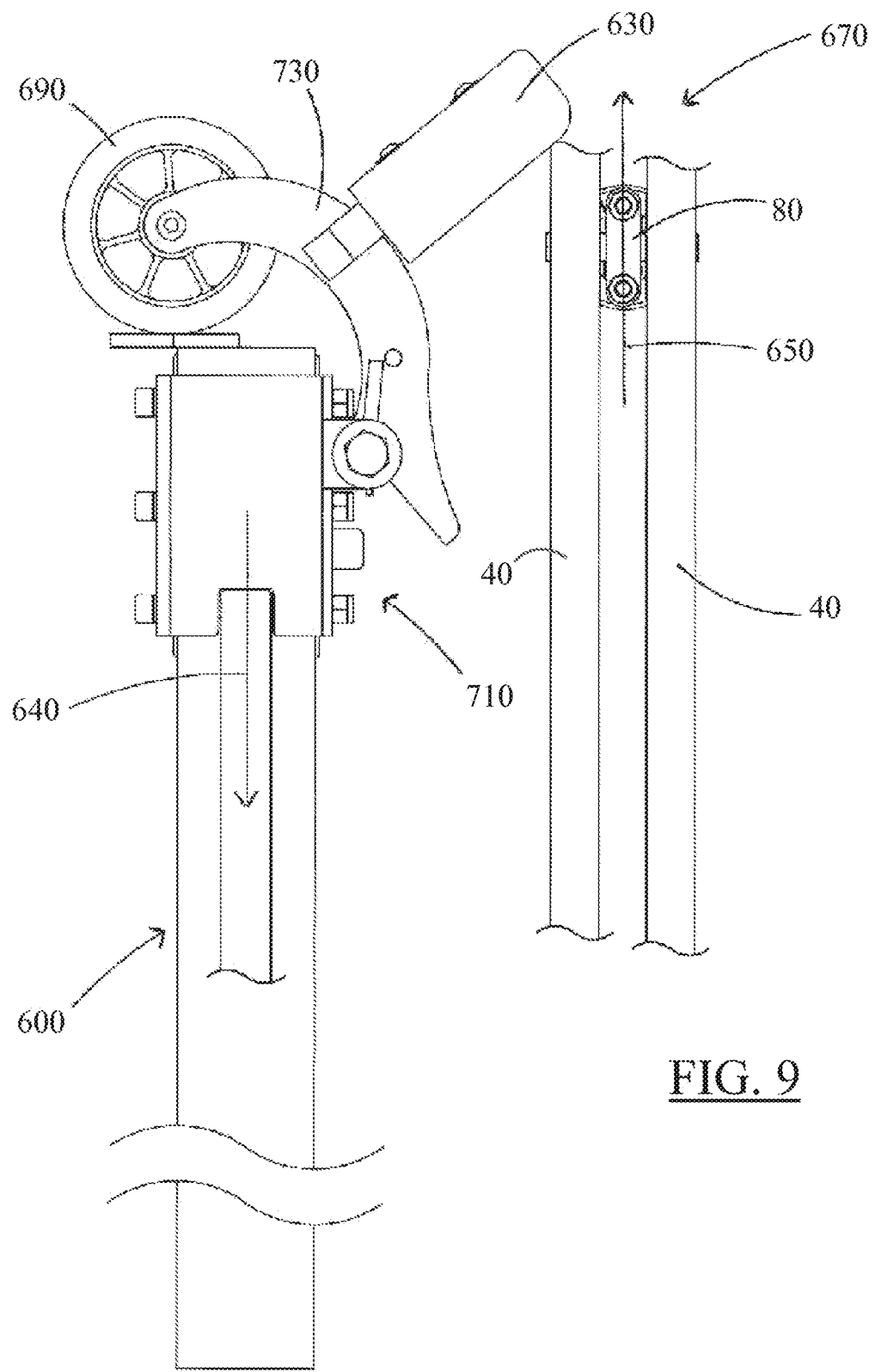
FIG. 9 illustrates an embodiment of the inline brake that can be used in the present invention when in open position.

FIG. 9 illustrates the inline brake being in an open position 670. After the member slide 80 is displaced past the contact member 630, then the member slide 80 can continue in its direction of travel 650. After which, a force creator 660, such as a spring or retraction strap may pull the inline brake carriage 710 back into a braking position 620, as illustrated in FIG. 8.

In one embodiment the inline brake 600 may be movably displaced along a braking track 680 and the braking track 680 may be disposed below the rail 40, as seen in FIG. 5.

In one embodiment, when in the braking position 620, after the member slide 80 contacts the inline brake 600, the inline brake 600 may have a carriage wheel 690 that may roll along the braking track 680 as the inline brake decelerates the member slide 80, as the member slide 80 and the inline brake decelerate in unison while traveling along the direction of travel 650. The carriage wheel 690 may then move to the side, which may cause the contact member 630 to be in an open position 670. The carriage wheel 690 may be caused to move to the side by reaching, or example the end of the braking track 680, or a gap in the braking track 680. The carriage wheel 690 may be attached to the carriage 710 by means of a pivoting finger 730. The contact member 630 may be securely fastened to the pivot finger 730. In this configuration the contact member 630 may be moved out of the path of travel 650 when the pivot finger 730 is moved in relation to the carriage wheel 690.

Figure 10:
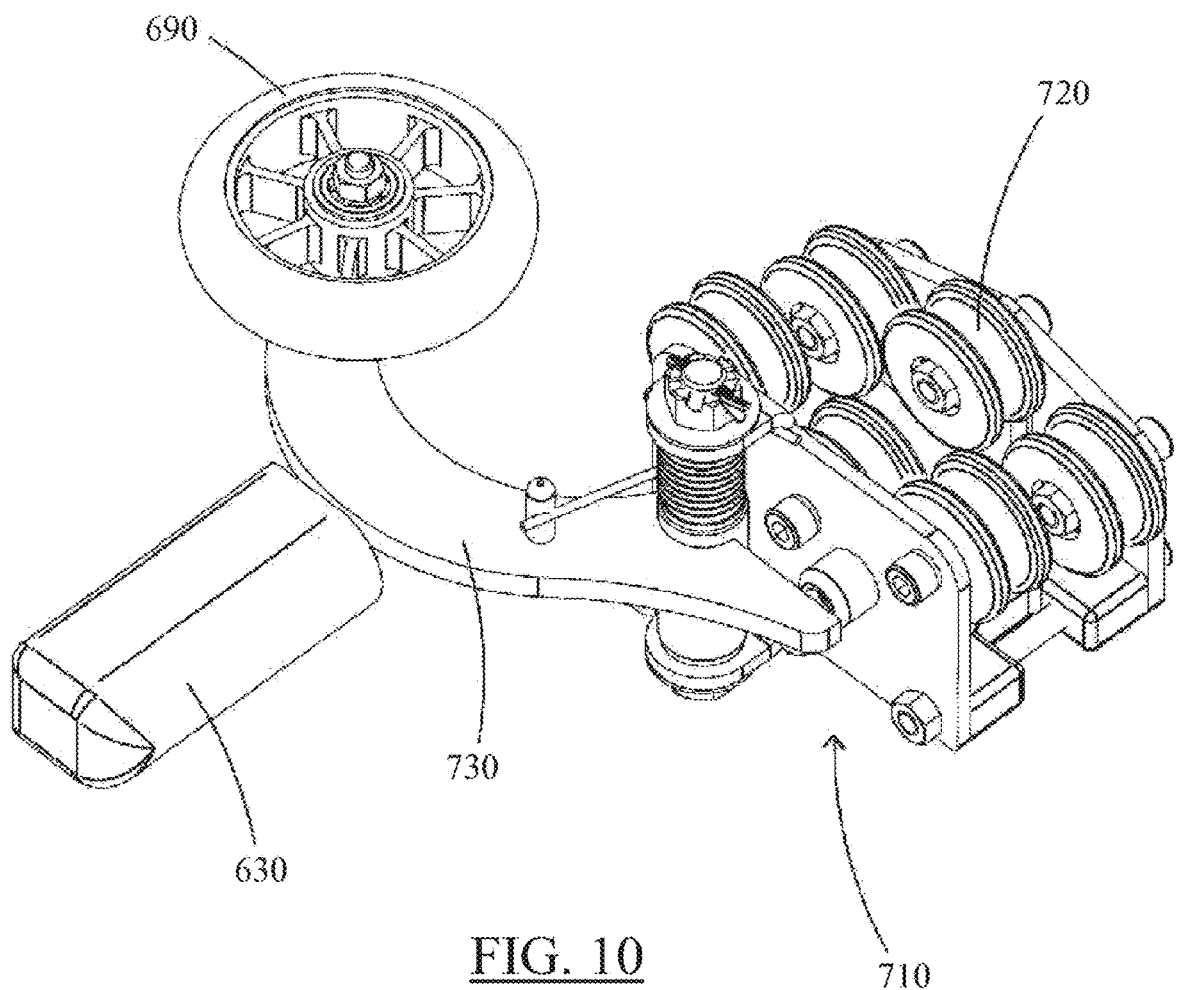
FIG. 10 illustrates a carriage that may be used with the inline brake.

FIG. 10 illustrates one embodiment of the carriage 710. FIG. 9 may illustrate the carriage 710 in an upside down position. The carriage 710 may have a carriage glide 720. In one embodiment the carriage glide 720 may be a wheel, or a set of wheels that can be displaced along the braking track 680 in both a direction of travel 650 and a direction of force 640. The carriage 710 may have a pivot finger 730 pivotally attached to the carriage 710 that the carriage wheel 690 may be rollably disposed on. The contact member 630 may be fixed to the pivot finger 730 so that it may be perpendicular to the brake track 680 when in the braking position 620.

Figure 11:
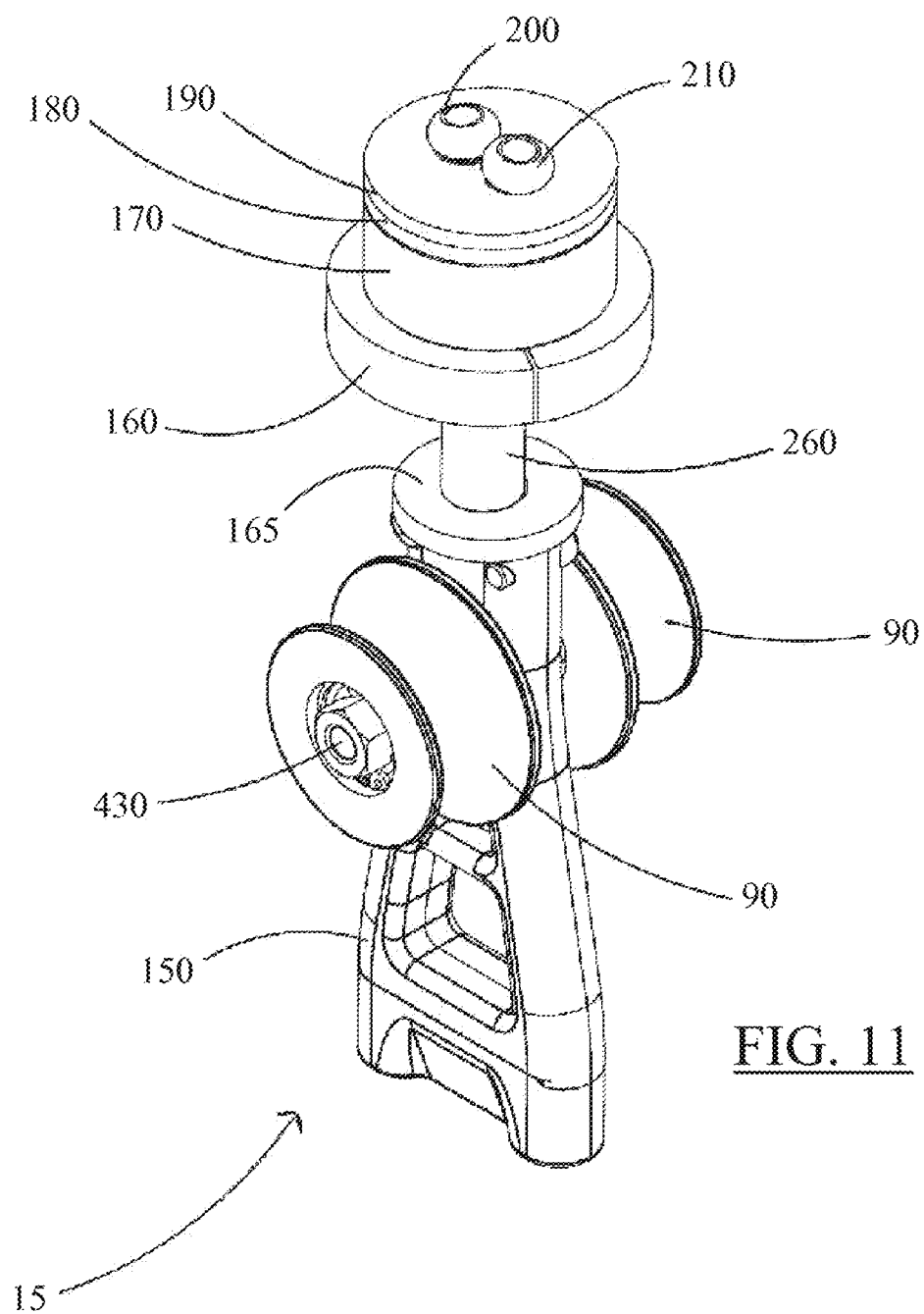
FIG. 11 illustrates an embodiment of the modified non-single point of failure member slide 15.

FIG. 11 illustrates an isometric view of the modified non-single point of failure member slide 15. The member slide frame 150 may be made of more than one piece as to encapsulate the first member 220 and second member 230 once fully assembled. The member slide frame provides a solid structure by which the axle 430 and wheels 90 may be rollably fixed. The first member 220 and second member 230 may extend from the bottom of the member slide frame 150 to the top. The first member retention means 200 and second member retention means 210 may retain all critical components needed to prevent the member slide 15 from exiting the zip line rail 10 and the challenge course track 105. The upper washer 190 and lower washer 180 provide strength and support to the upper disk 170. The puck 160 acts similar to that of the upper disk 170. In this embodiment the puck 160 is a replaceable wearing element whereas the upper disk 170 is not. The sheath 260 covers and protects the first member 220 and second member 230 between the upper disk 170 and lower disk 165.

Figure 12:
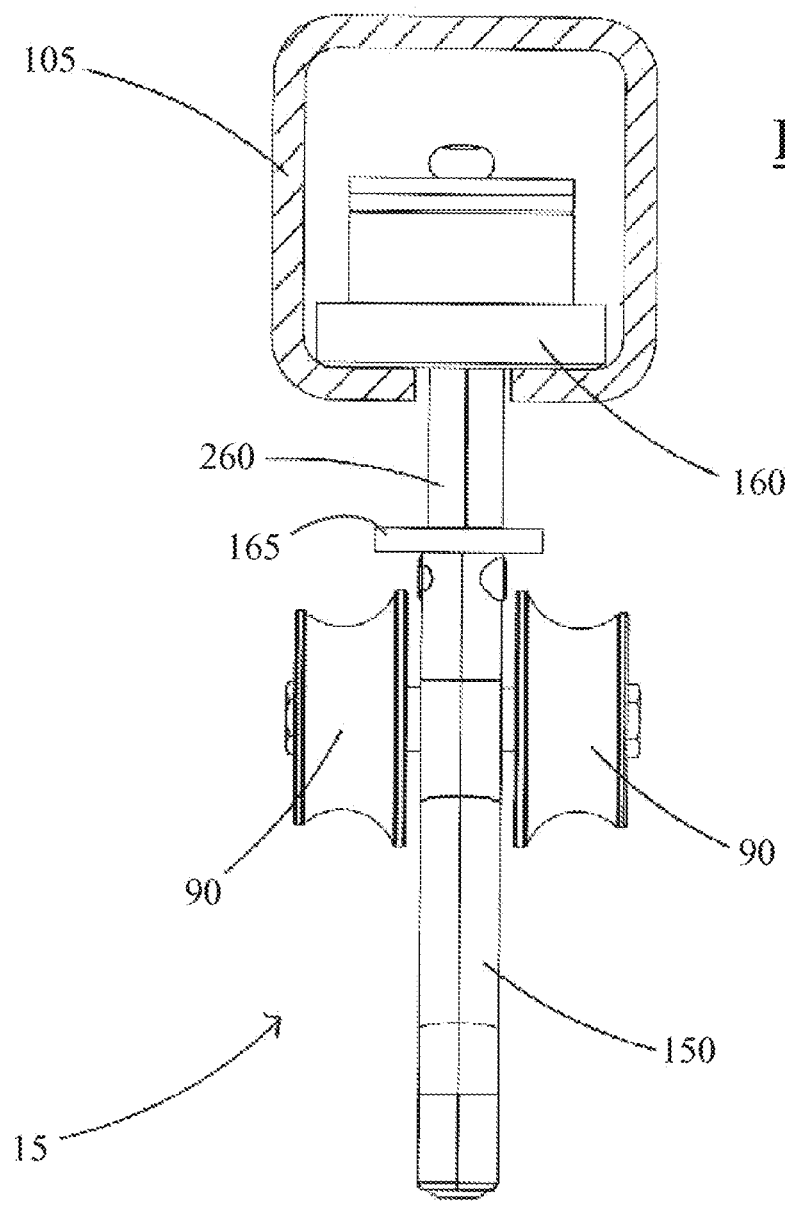
FIG. 12 illustrates an embodiment of the modified non-single point of failure member slide 15 and the challenge course track 105.

FIG. 12 illustrates the correlation between the modified non-single point of failure member slide 15 and the challenge course track 105. The wheels 90 may be rollably fixed to either side of the member slide frame 150. In this embodiment the wheels 90 may be positioned outside and below the challenge course track 105. Wearing components slide against the surfaces of the challenge course track 105. Said components may consist of the puck 160, the sheath 260, and the lower disk 165.

Figure 13:
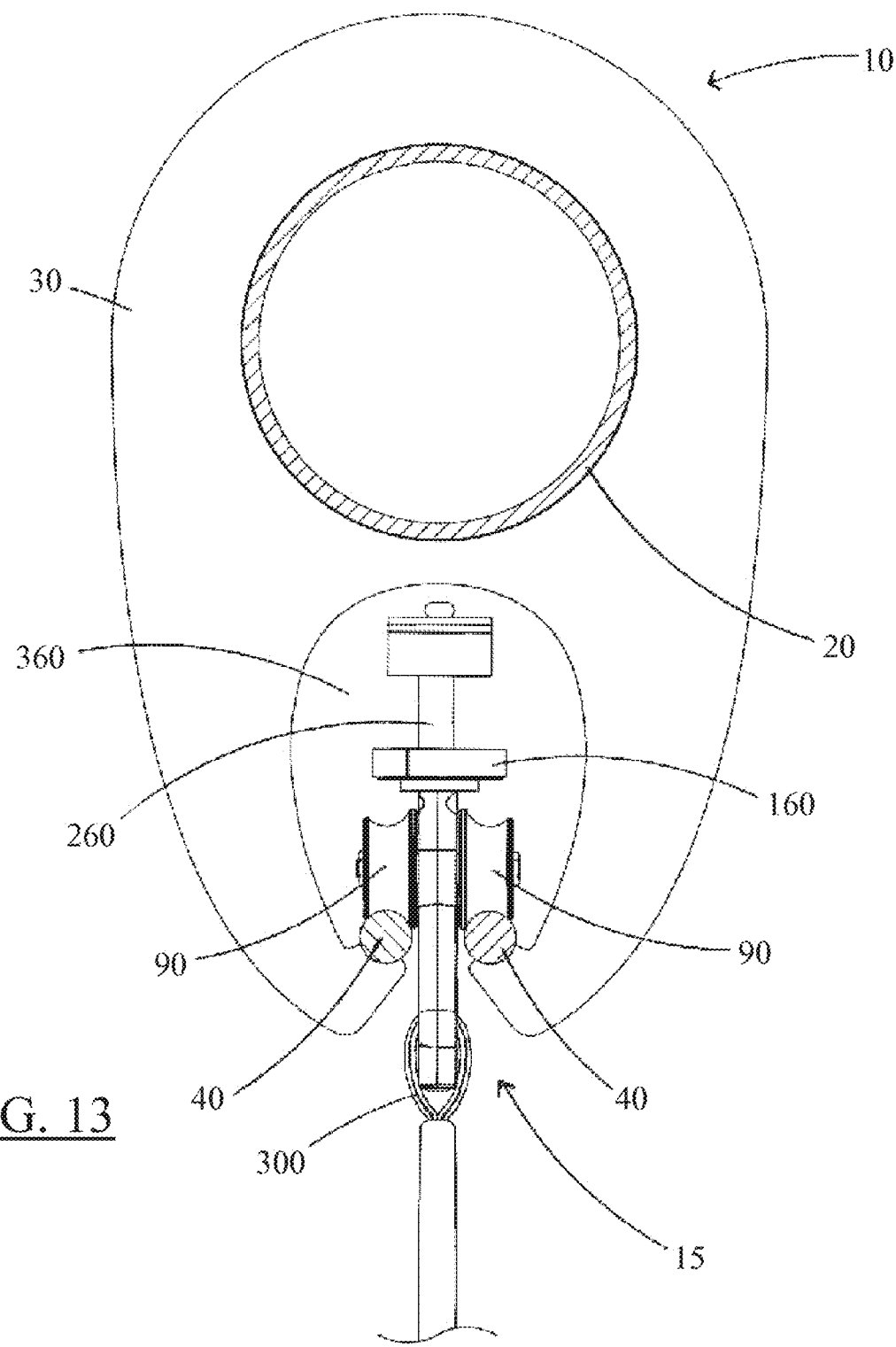
FIG. 13 illustrates an embodiment of the modified non-single point of failure member slide 15; and the zip line rail system 10.

FIG. 13 illustrates the correlation between the non-single point of failure member slide 15 and the zip line rail 10. The zip line rail may consist of a support member 20 fixed to support plates 30 which securely position rails 40. An inner channel 360 may be a cut out section of the support plate 30. The member slide 15 may be allowed to pass through the inner channel 360. A belt or strap 300 attaches the member slide 15 to the harness worn by a person utilizing the present invention 10.

Figure 14:
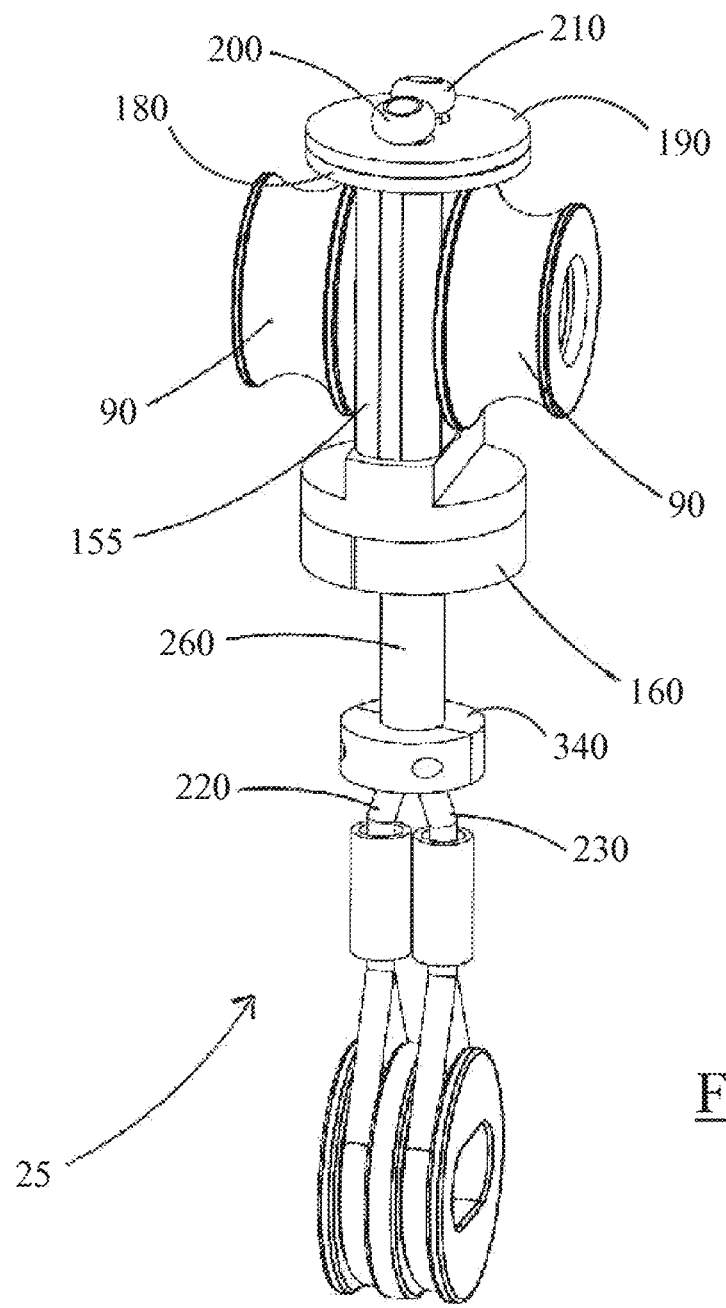
FIG. 14 illustrates an embodiment of an alternate modified non-single point of failure member slide 25.

FIG. 14 illustrates the embodiment an alternate non-single point of failure member slide 25. In this variation the wheels 90 may be located above the puck 160. The first member 220 and second member 230 may extend the entire length of the member slide 25 thereby retaining all critical components. First member retention means 200 and second member retention means 210 retain upper washer 190 and lower washer 180. An alternate member slide frame 155 may be positioned below the lower washer 180. The alternate member slide frame 155 provides a structure where wheels 90 may be rollably fixed. Below the alternate member slide frame 155 is a puck 160. The puck 160 may be a slider member for engagement with the challenge course track 105. The sheath 260 may be a hollow tube extending from the puck 160 to the sheath-member securement device 340. The sheath 260 protects the first member 220 and second member 230 from wear when traversing the challenge course track 105. The sheath-member securement device 340 may be any removable clamping mechanism such as a two piece collar or hose clamp type.

Figure 15:
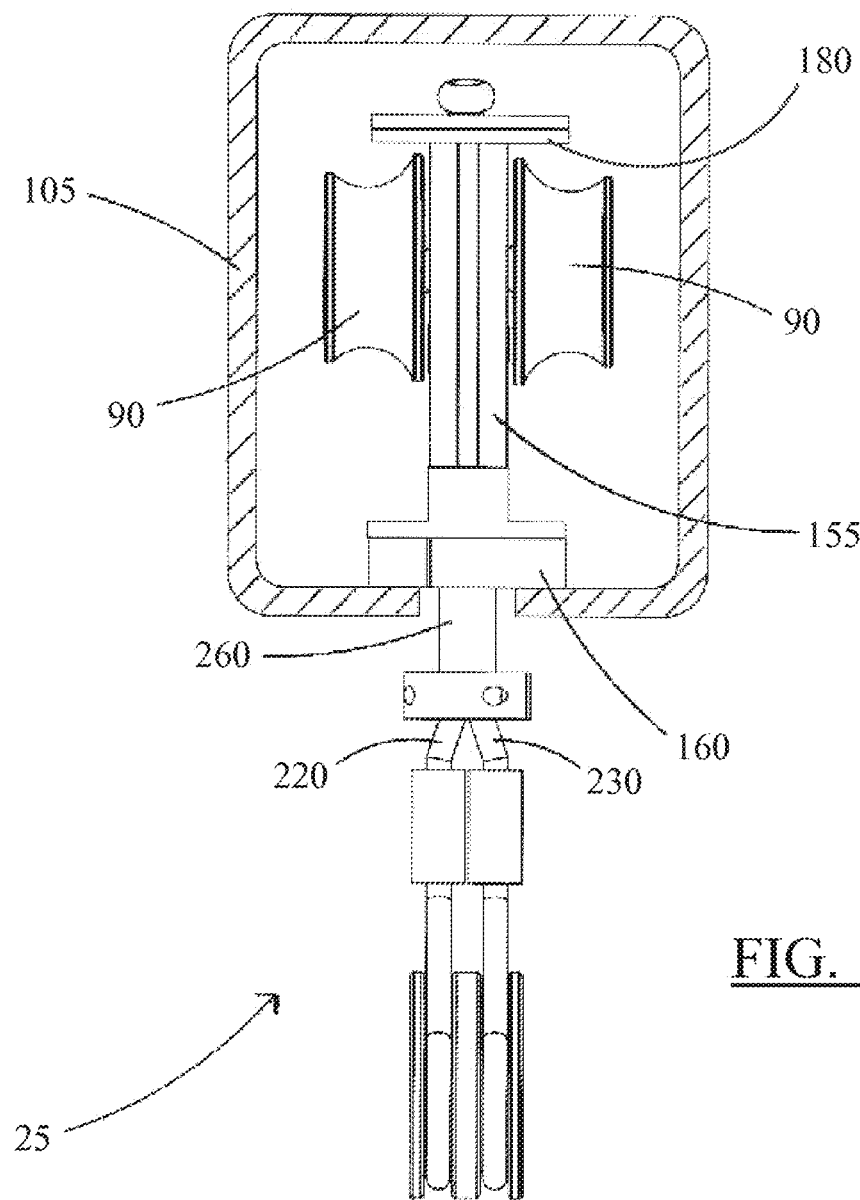
FIG. 15 illustrates an embodiment of the alternate modified non-single point of failure member slide 25; and the challenge course track 105.

FIG. 15 illustrates the relation between the alternate non-single point of failure member slide 25 and the challenge course track 105. In this variation the wheels 90 may be located above the puck 160. The first member 220 and second member 230 may extend the entire length of the member slide 25 thereby retaining all critical components. An alternate member slide frame 155 may be positioned below the lower washer 180. The alternate member slide frame 155 provides a structure where wheels 90 may be rollably fixed. Below the alternate member slide frame 155 is a puck 160. The puck 160 may be a slider member for engagement with the challenge course track 105. The sheath 260 may be a hollow tube extending from the puck 160 to the sheath-member securement device 340. The sheath 260 protects the first member 220 and second member 230 from wear when traversing the challenge course track 105.

Figure 16:
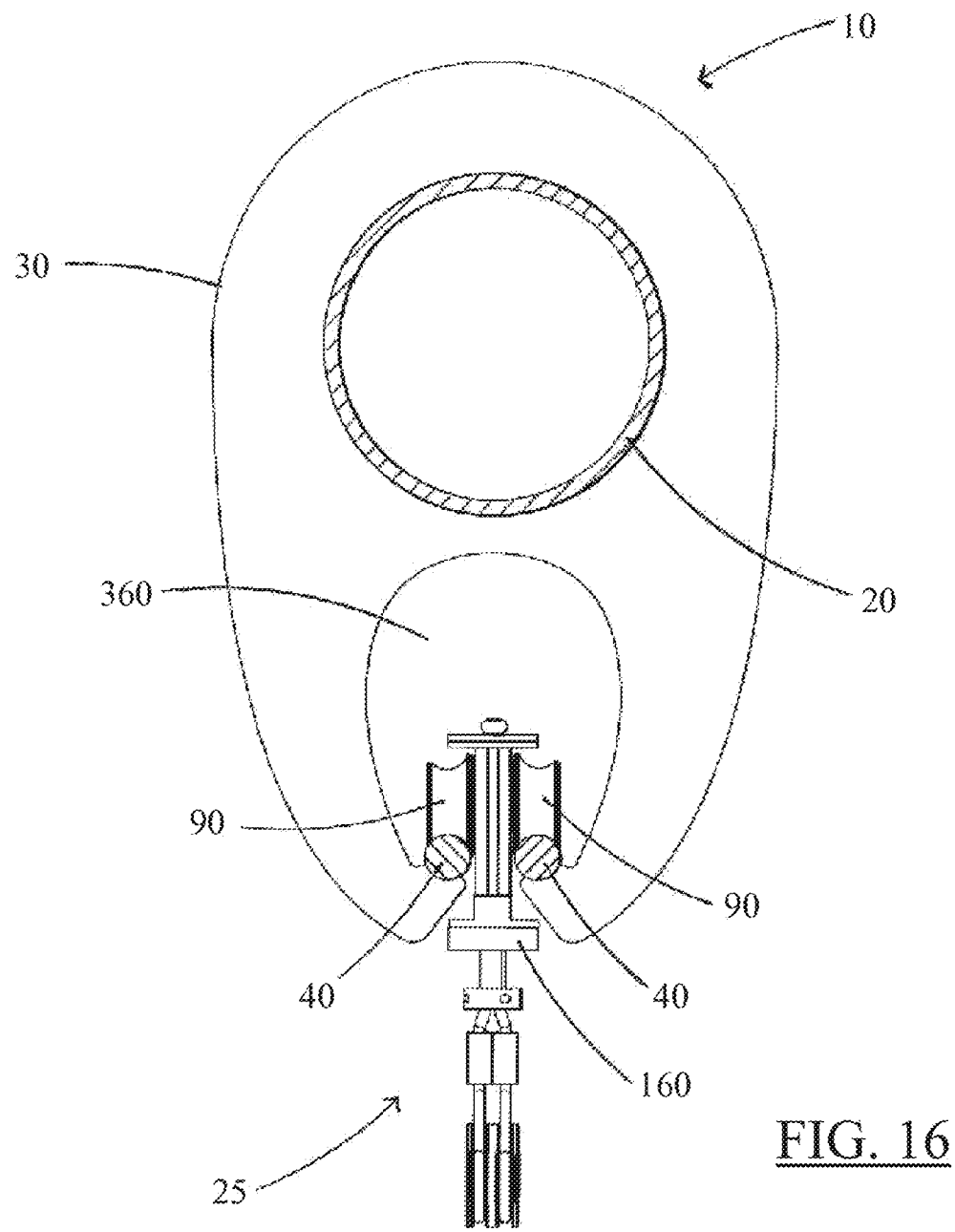
FIG. 16 illustrates an embodiment of the alternate modified non-single point of failure member slide 25; and the zip line rail system 10.

FIG. 16 illustrates the relation between the alternate non-single point of failure member slide 25 and the zip line rail 10. In this variation the wheels 90 may be located above the puck 160. The wheels 90 engage the rails 40 and may roll the length of the zip line rail 10. The rails 40 may be fixed to the support plate 30. The support plate 30 may have an inner channel 360 through which the member slide 25 may be allowed to pass. The length of the zip line rail 10 may be supported by the support member 20. The puck 160 may be a slider member for engagement with the challenge course track 105. In this particular configuration the puck 160 may be located below the rails 40.

Figure 17:
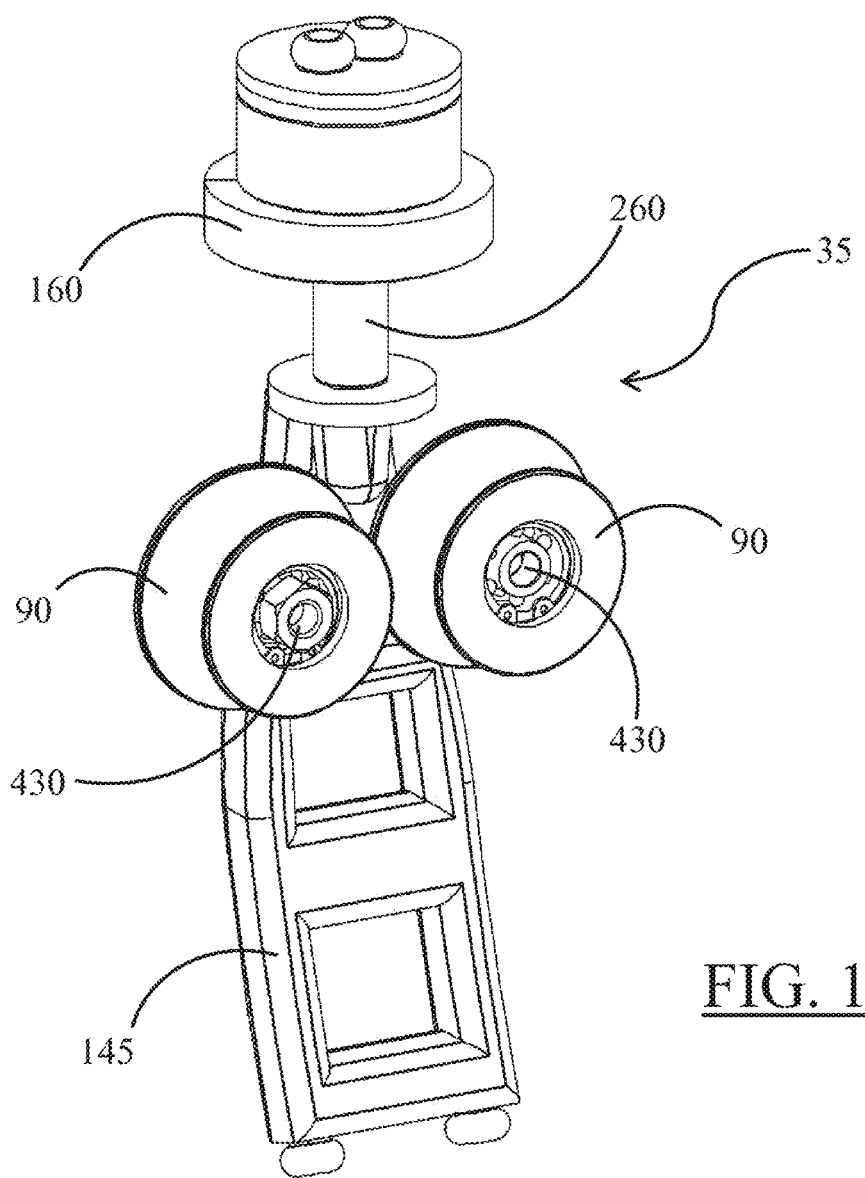
FIG. 17 illustrates an embodiment of an offset non-single point of failure member slide 35; and inline wheel 90 configuration.
Figure 18:
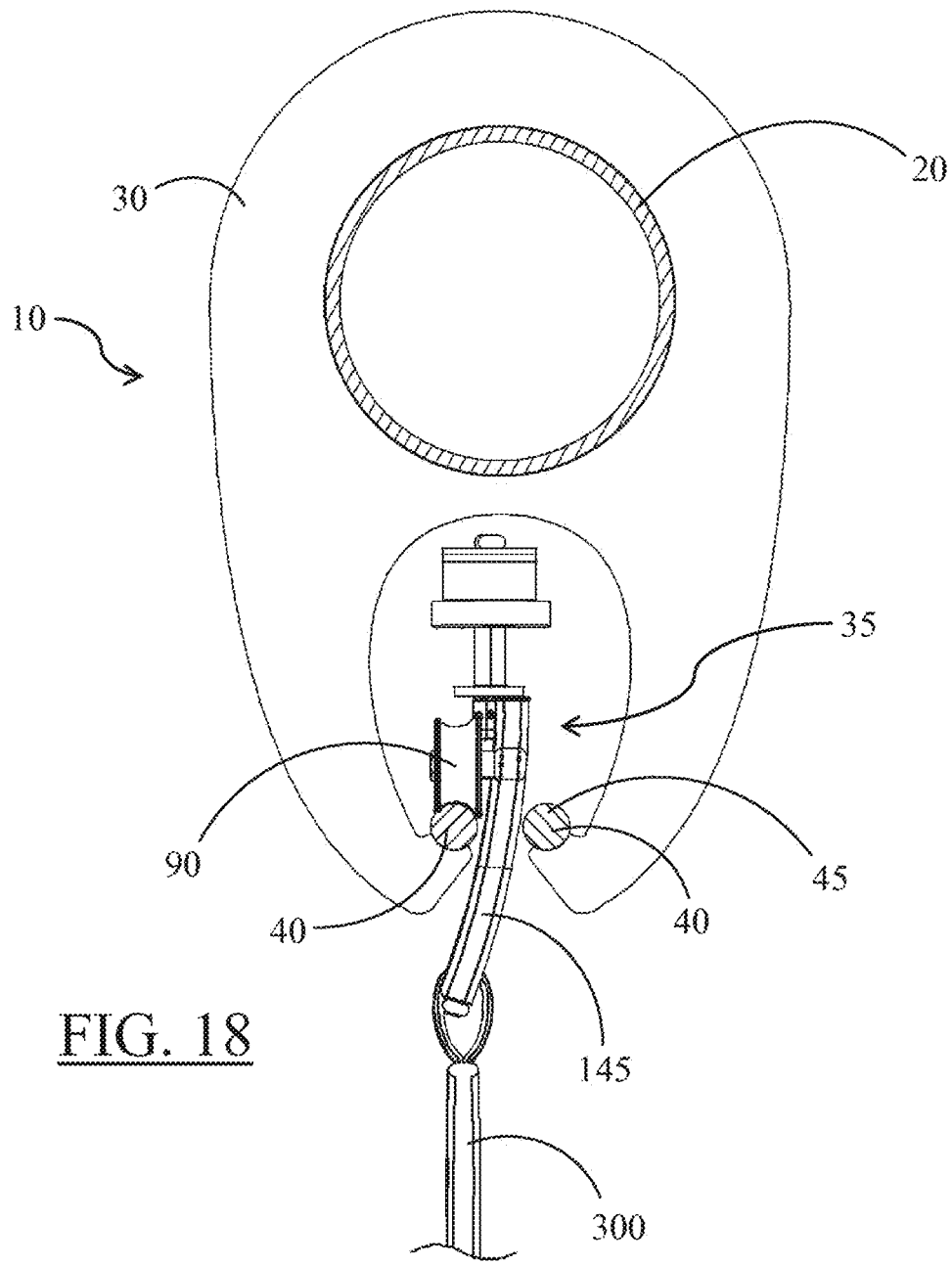
FIG. 18 illustrates an embodiment of an offset non-single point of failure member slide 35; and the zip line rail system 10.

FIG. 17 illustrates the embodiment of the offset non-single point of failure member slide 35. The offset member slide frame 145 may allow for two wheels 90 to be rollably fixed on axles 430. The wheels 90 may be fixed to one side of the offset member slide frame 145 in a linear orientation. Said linear orientation may allow both wheels 90 to roll along the length of one rail 40 as shown in FIG. 18. The offset member slide 35 may also have similar components to that of the modified non-single point of failure member slide 15 shown in FIG. 11. The puck 160 may engage the challenge course track 105. The sheath may cover both first member 220 and second member 230 in a similar configuration to that shown in FIG. 6.

FIG. 18 illustrates the relation between the offset non-single point of failure member slide 35 and the zip line rail system 10. A plate or plates 30 are fixed to a support member 20. The plate may extend downwardly to support a rail or rails 40. This configuration may allow for one or both rails 40 to be of proper fit for wheels 90 to roll. The offset member slide 35 may only require one rolling surface or rail 40. This configuration may allow for a rail 40 which only serves the purpose of retaining or capturing the offset member slide 35. FIG. 18 shows the rail 40 opposite that of the wheels 90 serving the purpose of a captive rail 45. The offset member slide frame 145 may be curved in a way to orientate the belt or strap 300 underneath the wheels 90. This configuration may allow the wheels 90 to be properly guided along the length of the rail 40. The captive rail 45 could be any structure that spans the length of the rail 40 and does not require a proper rollable surface.

The present invention 10 allows the member slide 80 to engage and disengage from a launch system 800 without reversing, changing course, or otherwise altering the path of the member slide 80. The launch system 800 may use the same components unique to the inline brake 600. It is therefore important to identify these unique components separately from the common technology such as winches and magnetic brakes which may change the direction of operation depending on the configuration.

The present invention 10 allows the member slide 80 to engage the inline brake 600 while travelling the length of the rail 40, zip line 110, or a challenge course 100. The present invention 10 described allows the inline brake 600 to be of any length and placed at any location along the length of the rail 40, challenge course 100, or zip line 110.

It should be understood, of course, that the foregoing relates to exemplary embodiments of the invention and that modifications may be made without departing from the spirit and scope of the invention as set forth in the following claims.

The invention claimed is:
1. A zip rail system for a challenge course, comprising:
two fixed wheel support surface rails which extend between a higher end and a lower end of the zip rail system, wherein the wheel support surface rails are separated from one another by a distance defining a member slide slot opening between the two wheel support surface rails, a member slide comprising a frame, a puck for engaging a challenge course track, and two wheels for engaging at least one of the two wheel support surface rails with at least a portion of the member slide extending downwardly through the member slide slot opening, and an inline brake comprising a braking track and a braking carriage movably mounted to the braking track which follows a linear path arranged alongside the wheel support surface rails at the lower end of the zip rail system, wherein the braking carriage has a contact member pivotably mounted thereon, wherein, in a braking position of the inline brake, the contact member is positioned below the wheel support surface rails and extends across a movement path of the member slide along the wheel support surface rails, and, in an open position of inline brake, the contact member is pivoted out of the movement path of the member slide along the wheel support surface rails, and wherein the inline brake decelerates the member slide, which moves in a direction of travel along the movement path, via the member slide engaging the contact member in the braking position and displacing the braking carriage along the braking track against a braking force, which opposes the direction of travel, until the member slide reaches a pivot point where the contact member pivots out of the movement path of the member slide into the open position of the inline brake, thereby allowing the member slide to disengage the inline brake and continue in the direction of travel.

2. The zip rail system of claim 1, wherein the contact member extends perpendicularly to the wheel support surface rails in the braking position.

3. The zip rail system of claim 1, wherein the pivot point where the contact member pivots out of the movement path of member slide is provided by an end of the braking track or a gap in the braking track.

4. The zip rail system of claim 1, wherein the braking carriage has a carriage wheel pivotably mounted thereon together with the contact member.

5. The zip rail system of claim 4, wherein, in moving from the braking position to the open position as the inline brake decelerates the slide member, the carriage wheel rolls along the braking track and then, at the pivot point, the carriage wheel moves sidewards away from the wheel support surface rails.

6. The zip rail system of claim 5, wherein, in the braking position, the carriage wheel is supported on a side of the braking track, and, in the open position, the carriage wheel is positioned behind an end of the braking track or in a gap in the braking track.

7. The zip rail system of claim 5, wherein the contact member and the carriage wheel are carried by a pivot arm attached to the braking carriage, with the carriage wheel arranged at a free end of the pivot arm opposite the braking carriage, and the contact member positioned on the pivot arm between the carriage wheel and the braking carriage.

8. The zip rail system of claim 7, wherein the pivot arm has a longitudinal extension which bends toward the braking track.

9. The zip rail system of claim 1, wherein the braking carriage comprises one or more wheels via which the braking carriage is movably mounted to the braking track in a bidirectional manner.

10. The zip rail system of claim 1, wherein the braking force is provided by a spring, retraction strap, winch, or eddy current brake.

11. The zip rail system of claim 1, wherein the inline brake is positionally biased to move back into the braking position from the open position, whereby the braking carriage is returned along the braking track in a reverse direction to the direction of travel of the member slide, after the member slide disengages the inline brake.

12. The zip rail system of claim 11, the braking carriage is restored in the reverse direction along the braking track via the braking force.

13. The zip rail system of claim 1, further comprising a support member carrying the wheel support surface rails.

14. The zip rail system of claim 13, wherein the support member has a plurality of support plates disposed thereon, the support plates each have two plate arms which extend downwardly, and each plate arm supports a respective one of the two wheel support surface rails.

15. The zip rail system of claim 14, wherein the braking track is supported by one or more support plates of the support member.

16. The zip rail system of claim 15, wherein the braking track is fastened to a respective support plate of the support member via a fixture.

17. The zip rail system of claim 14, wherein the support member of the zip rail system is supported by one or more arms connected to and extending from the challenge course, a building, or a support column.

18. The zip rail system of claim 1, wherein the two wheels of the member slide are disposed outwardly on opposite sides of the frame, and each wheel engages a respective one of the two wheel support surface rails.

19. The zip rail system of claim 1, wherein the two wheels are disposed on the member slide lower than the puck.

20. The zip rail system of claim 1, wherein the contact member of the inline brake engages the frame of the member slide in the braking position.

21. A challenge course having a zip rail system according to claim 1, and further comprising the challenge course track, wherein the puck of the member slide has a width larger than a slot that extends along the challenge course track, such that the member slide extends through the slot when the member slide is engaged with the challenge course track with the puck above the slot.

* * * * *